(12) United States Patent
Schell et al.

(10) Patent No.: US 9,515,985 B2
(45) Date of Patent: Dec. 6, 2016

(54) PLATFORM FOR PRIVATE INTERNET PROTOCOL (IP) CLOUD SERVICES

(71) Applicant: Verizon Patent and Licensing Inc., Basking Ridge, NJ (US)

(72) Inventors: Richard C. Schell, Allen, TX (US); William F. Copeland, Garland, TX (US); Scott W. Gross, Washington, DC (US); Thomas J. O'Keefe, Carrollton, TX (US); Luis M. Tomotaki, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 322 days.

(21) Appl. No.: 14/063,552

(22) Filed: Oct. 25, 2013

(65) Prior Publication Data

US 2014/0250240 A1    Sep. 4, 2014

Related U.S. Application Data

(60) Provisional application No. 61/771,265, filed on Mar. 1, 2013.

(51) Int. Cl.
*H04L 29/12* (2006.01)
*H04L 12/721* (2013.01)

(52) U.S. Cl.
CPC .......... *H04L 61/2535* (2013.01); *H04L 45/72* (2013.01); *H04L 61/2514* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,628,023 | A * | 5/1997 | Bryant | G06F 12/145 711/207 |
| 7,043,633 | B1 * | 5/2006 | Fink | H04L 29/12009 370/392 |
| 8,037,530 | B1 * | 10/2011 | Fink | H04L 9/0841 713/153 |
| 8,411,667 | B2 * | 4/2013 | Scholl | H04L 45/02 370/351 |

(Continued)

OTHER PUBLICATIONS

Rekhter et al., "Address Allocation for Private Internets", Network Working Group RFC—1918, Feb. 1996, 10 pages.

(Continued)

*Primary Examiner* — Saket K Daftuar

(57) ABSTRACT

A device receives data from a user device, where the data is associated with a customer address, and the customer address is associated with the user device. The device verifies that the customer address is associated with a customer that subscribes to a private cloud service. The device translates, when the customer address is verified, the customer address to an address that is unique to a customer virtual route forwarding (VRF) function provide by the device. The device provides, based on translating the customer address, the data to the customer VRF function via the unique address. The device routes, based on providing the data to the customer VRF function, the data to the private cloud service via the customer VRF function and a secure connection.

20 Claims, 10 Drawing Sheets

(56) References Cited

U.S. PATENT DOCUMENTS

| | | | |
|---|---|---|---|
| 8,660,129 B1* | 2/2014 | Brendel | H04L 12/4641 370/397 |
| 8,667,138 B2* | 3/2014 | Ganesan | G06F 9/5072 709/203 |
| 9,137,202 B2* | 9/2015 | Nguyen | H04L 12/18 |
| 9,154,327 B1* | 10/2015 | Marino | G06Q 30/04 |
| 2005/0108407 A1* | 5/2005 | Johnson | H04L 63/16 709/228 |
| 2006/0242333 A1* | 10/2006 | Johnsen | G06F 13/4022 710/30 |
| 2010/0235526 A1* | 9/2010 | Carter | G06F 9/505 709/229 |
| 2010/0235539 A1* | 9/2010 | Carter | G06F 9/505 709/238 |
| 2011/0142054 A1* | 6/2011 | Scholl | H04L 45/02 370/395.31 |
| 2012/0102240 A1* | 4/2012 | Wei | H04L 12/403 710/30 |
| 2012/0110185 A1* | 5/2012 | Ganesan | G06F 9/5072 709/226 |
| 2012/0151057 A1* | 6/2012 | Paredes | H04L 12/4641 709/225 |
| 2012/0317235 A1* | 12/2012 | Nguyen | H04L 12/18 709/219 |
| 2013/0046982 A1* | 2/2013 | Suh | G06F 9/5072 713/171 |
| 2013/0047151 A1* | 2/2013 | Sridharan | G06F 9/45558 718/1 |
| 2013/0179593 A1* | 7/2013 | Dunlap | H04L 45/42 709/244 |
| 2013/0311778 A1* | 11/2013 | Cherukuri | H04L 63/0272 713/171 |
| 2013/0346573 A1* | 12/2013 | Hemachandran | G06F 9/5072 709/223 |
| 2014/0092899 A1* | 4/2014 | Krishna | H04L 61/2517 370/389 |

OTHER PUBLICATIONS

Srisuresh et al., "IP Network Address Translator (NAT) Terminology and Considerations", Network Working Group RFC—2663, Aug. 1999, 31 pages.

Hinden et al., "Unique Local IPv6 Unicast Addresses", Network Working Group RFC—4193, Oct. 2005, 17 pages.

* cited by examiner

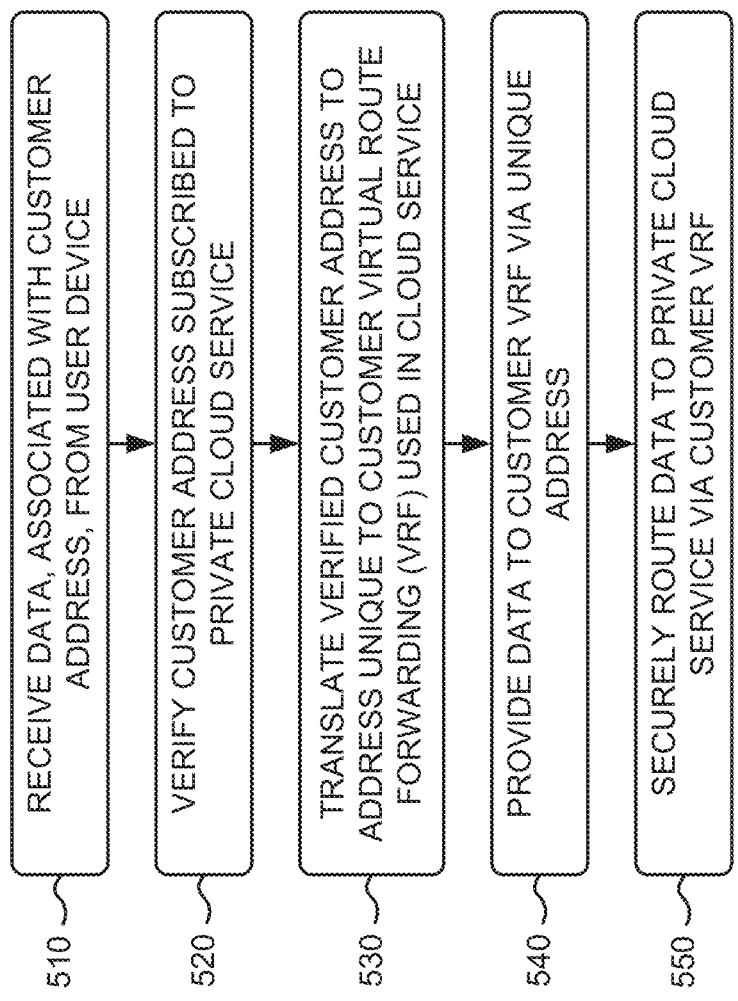

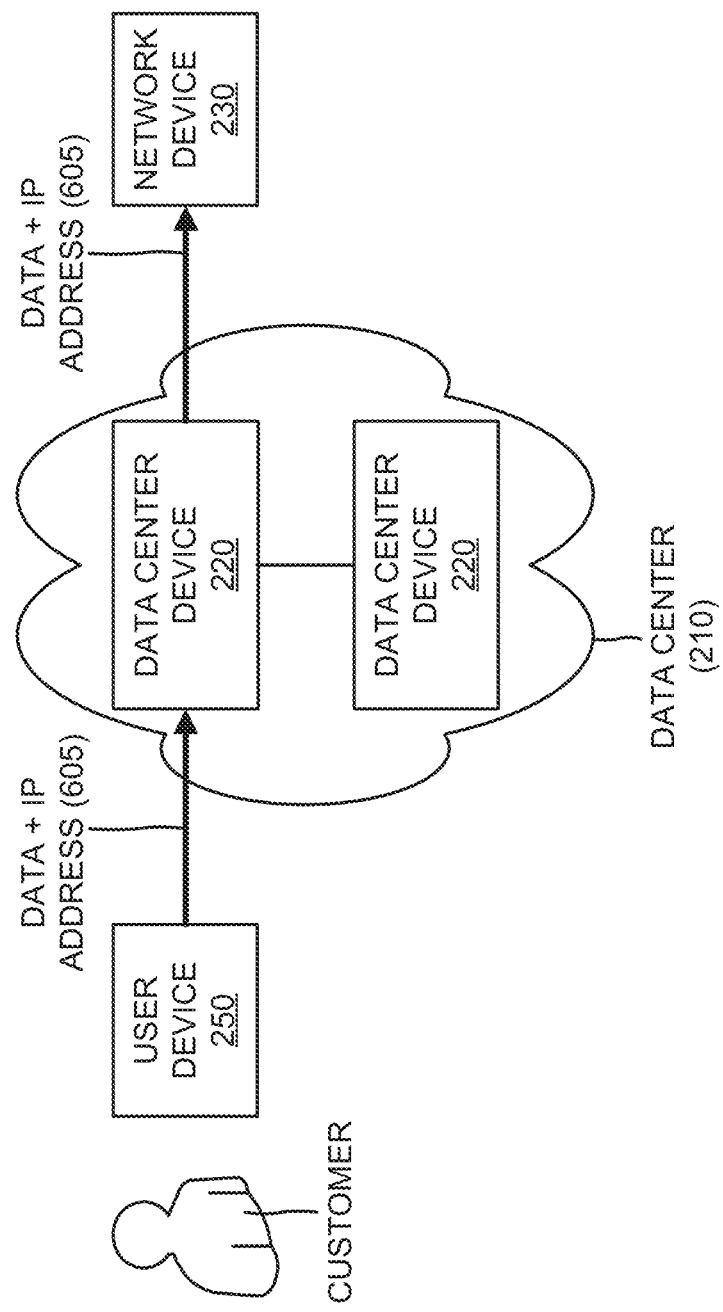

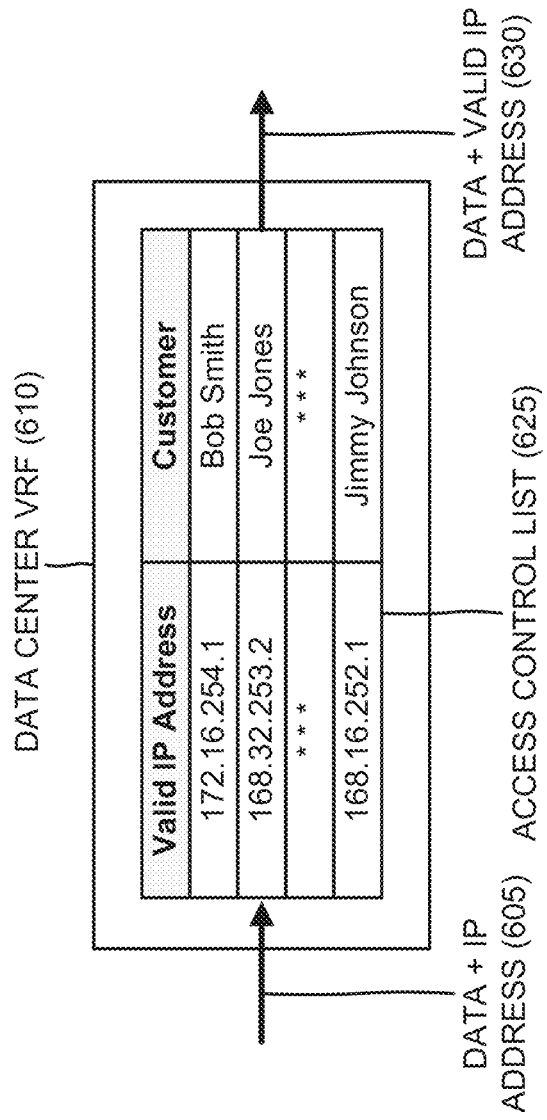

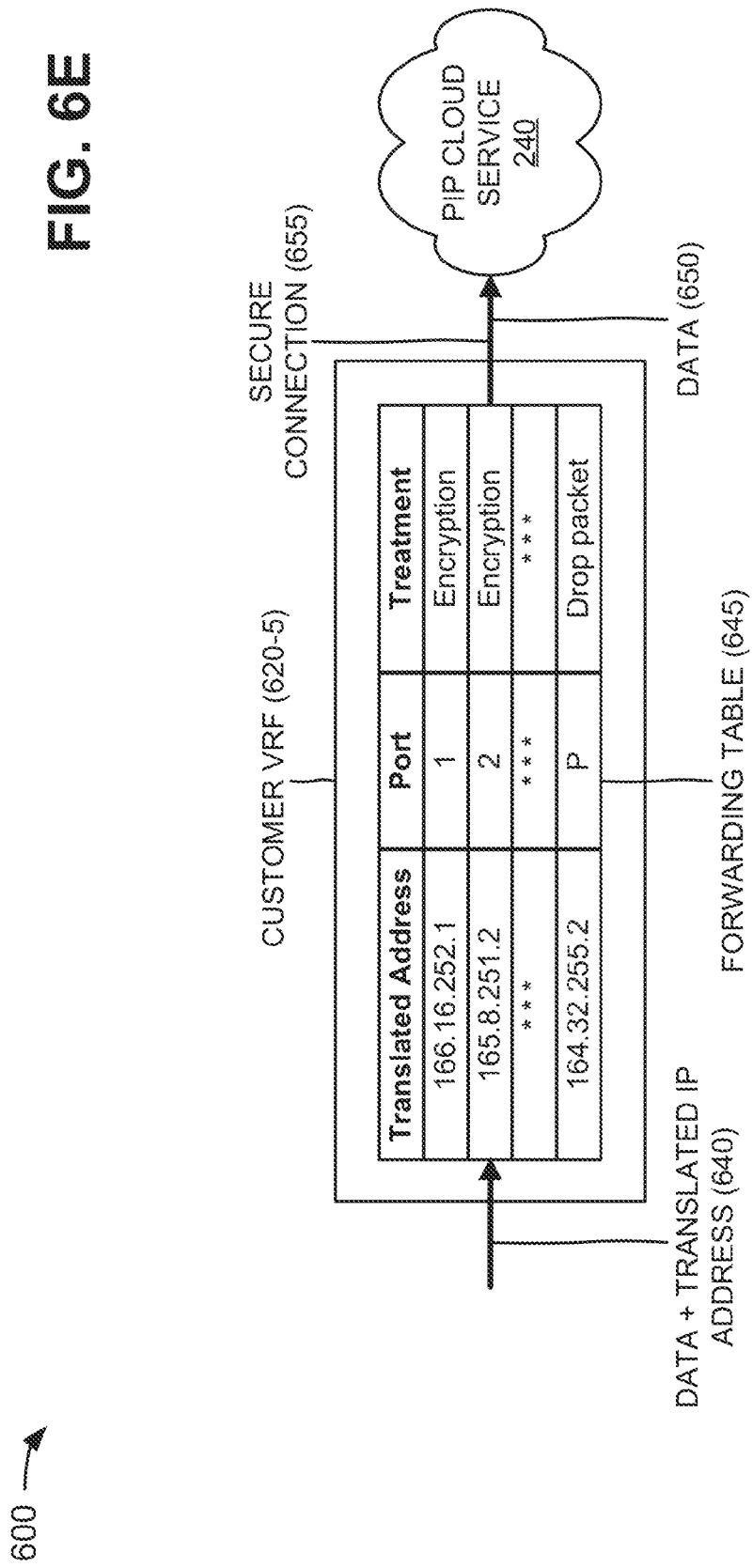

PLATFORM FOR PRIVATE INTERNET PROTOCOL (IP) CLOUD SERVICES

RELATED APPLICATION

This application claims priority under 35 U.S.C. §119 based on U.S. Provisional Patent Application No. 61/771,265, filed Mar. 1, 2013, the disclosure of which is incorporated by reference herein in its entirety.

BACKGROUND

Cloud computing is the delivery of computing as a service rather than as a product, where shared resources, software, and information are provided to user devices (e.g., computers, smart phones, etc.) over a network, such as the Internet. Cloud computing environments provide computation, software, data access, and/or storage services that do not require end-user knowledge of a physical location and configuration of a system that delivers the services.

A data center is a facility used to house computer systems and associated components, such as telecommunication systems and storage systems. A data center generally includes redundant or backup power supplies, redundant data communications connections, environmental controls (e.g., air conditioning, fire suppression, etc.), and/or security devices. In one example, a data center may share information with a cloud computing environment that may be utilized by user devices.

When accessing a private Internet protocol (IP) cloud computing environment via a data center, customers (e.g., via user devices) may utilize a large number of IP version 4 (IPv4) private addresses, which may lead to overlap (or reuse) of the same addresses across different private IP customers. In order to ensure security in such arrangements, a physical connection is provided from the data center to a virtual route forwarding (VRF) function for each customer. The VRF functions may enable the customers to securely communicate with private IP cloud services. However, this arrangement is expensive and does not provide flexibility since physical connections are required for all customers. The arrangement also prevents customers, with existing private IP services, from using the customer's IP addressing when the customer's IP addressing overlaps with the IP addressing used in the data center.

BRIEF DESCRIPTION OF THE DRAWINGS

FIG. 5 is a flow chart of an example process for securely routing customer data to a private IP cloud service; and FIGS. 6A-6E are diagrams of an example relating to the example process shown in FIG. 5.

DETAILED DESCRIPTION OF PREFERRED EMBODIMENTS

The following detailed description refers to the accompanying drawings. The same reference numbers in different drawings may identify the same or similar elements.

Figure 1:
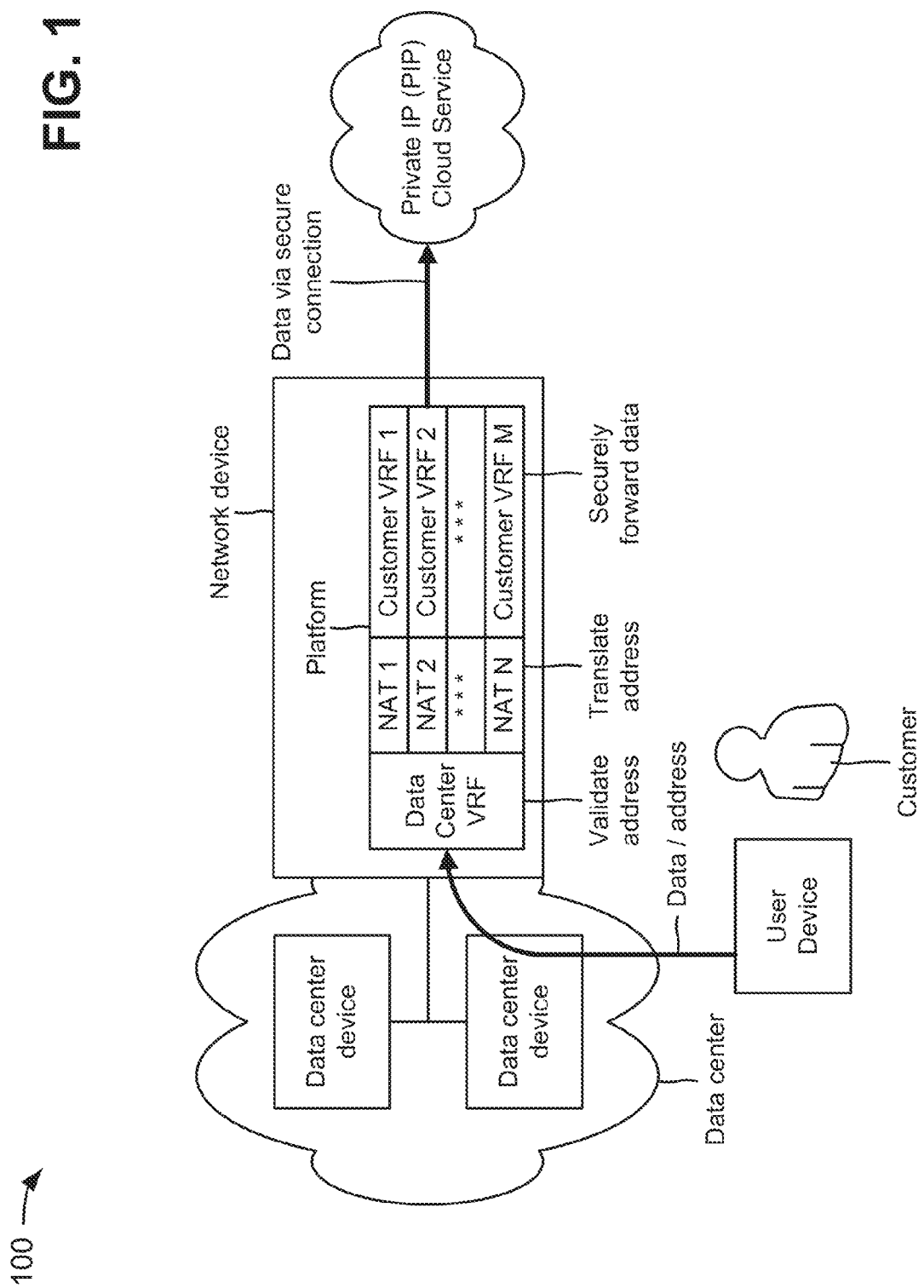
FIG. 1 is a diagram of an overview of an example implementation described herein.

FIG. 1 is a diagram of an overview of an example implementation 100 described herein. As shown, a user device, a data center with data center devices, a network device with a platform, and a private IP (PIP) cloud service may be connected together. The user device may be associated with a customer, and the customer may wish to access the PIP cloud service. The data center may include one or more facilities and/or one or more networks with computer systems, server devices, and associated components, such as telecommunications and storage systems. The data center device may receive shared resources, services, etc. from the PIP cloud service. The network device may include a device that processes and/or transfers traffic. The platform may include one or more network address translation (NAT) functions provided between two or more VRF functions (e.g., a data center VRF function and one or more customer VRF functions). The PIP cloud service may include an environment that provides shared resources, services, etc. to the data center devices and/or the user device.

In example implementation 100, assume that the customer utilizes the user device to generate a request to access the PIP cloud service. The request may include data and a customer address associated with the user device. The user device may provide the data and the customer address to a data center device of the data center. The data center device may provide the data and the customer address to the data center VRF function of the platform. The data center VRF function may communicate with one or more data center devices of the data center. Any number of the data center devices may require access to the PIP cloud service. Thus, the data center VRF function may be shared by data center devices requesting the PIP cloud service.

As further shown in FIG. 1, the data center VRF function may receive the data and the customer address, and may validate the customer address. For example, the data center VRF function may verify that the customer, associated with the customer address, is subscribed to the PIP cloud service. If the customer address is valid, the data center VRF function may provide the data and the customer address to a particular NAT function associated with the customer. The particular NAT function may translate the customer address to an address that is unique to a particular customer VRF function associated with the customer. The particular NAT function may provide the data to the particular customer VRF function based on the unique address. The particular customer VRF function may securely forward the data to the PIP cloud service via a secure connection, as further shown in FIG. 1.

In some implementations, the PIP cloud service may provide return data to the particular customer VRF function, and the particular customer VRF function may provide the return data to the particular NAT function. The particular NAT function may provide the return data to the data center VRF function, and the data center VRF function may provide the return data to the data center device. The data center device, in turn, may provide the return data to the user device via the customer address.

Such a platform may enable customers, with existing PIP cloud services, to continue to use their own IP addressing even if the customers' IP addressing overlaps with IP addressing used in the data center. The platform may reduce costs associated with physical connections, and may provide flexibility since physical connections are not required for all customers.

Figure 2:
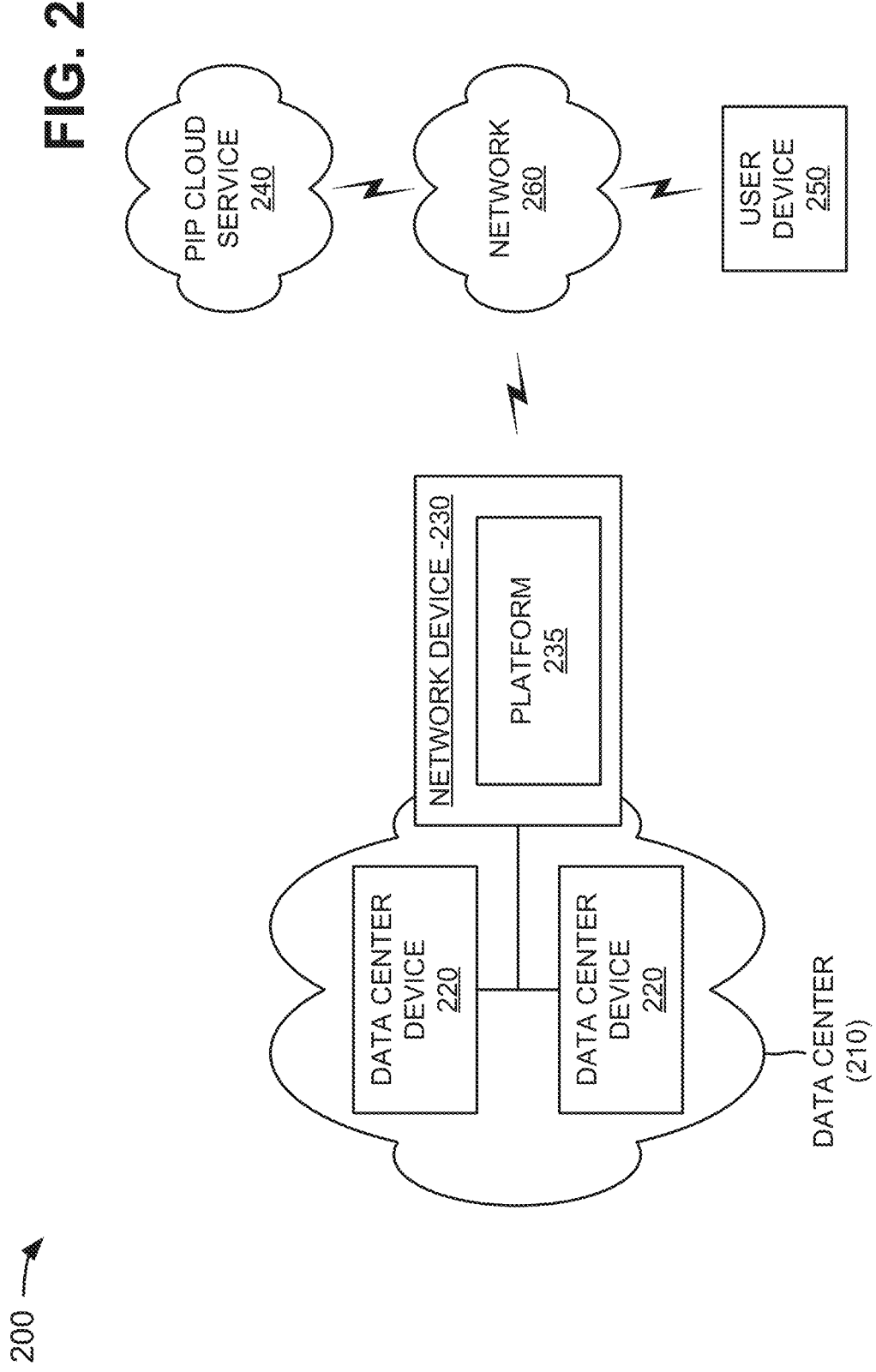
FIG. 2 is a diagram of an example environment in which systems and/or methods described herein may be implemented.

FIG. 2 is a diagram of an example environment 200 in which systems and/or methods described herein may be implemented. As illustrated, environment 200 may include a data center 210 with data center devices 220, a network device 230 with a platform 235, a PIP cloud service 240, a user device 250, and a network 260. Devices/networks of environment 200 may interconnect via wired and/or wireless connections.

Data center 210 may include one or more facilities and/or one or more networks with computer systems, server devices, and associated components, such as telecommunications and storage systems. Data center 210 may include redundant or backup power supplies, redundant data communications connections, environmental controls, security devices, etc. In some implementations, data center 210 may share information, with PIP cloud service 240, which may be utilized by user device 250. In some implementations, data center 210 may include resources, such as a device (e.g., a network device, a server, a computer system, etc.), data (e.g., availability information, license information, etc.), a service (e.g., a load balancing service, network information collection, etc.), etc.

Data center device 220 may include one or more personal computers, workstation computers, server devices, or other types of computation and communication devices. In some implementations, data center device 220 may receive shared resources, services, etc. from PIP cloud service 240.

Network device 230 may include a gateway, a router, a switch, a firewall, a network interface card (NIC), a hub, a bridge, a proxy server, a multiplexer, and/or some other type of device that processes and/or transfers traffic. In some implementations, network device 230 may include platform 235. Platform 235 may include one or more NAT functions provided between a data center VRF function and one or more customer VRF functions. The data center VRF function of platform 235 may communicate with one or more data center devices 220, and may be shared by data center devices 220 requesting services from PIP cloud service 240. The NAT functions may translate public or private IP addresses to an address space that is unique to each customer VRF function. The customer VRF functions may provide secure connections to PIP cloud service 240.

In some implementations, customers may use a large amount of IPv4 private addressing (e.g., addressing defined in RFC 1918), which may lead to overlap (or reuse) of the same addresses across different private IP customers. Data center 210 may provide centrally shared resources and may be reachable from the public Internet. In order to reach publicly available services, customers may use public IP addressing since data center 210 may not virtualize IP address space. In some implementations, platform 235 may be implemented to provide private IP services to data center 210 and to leverage routing already being performed in data center 210.

In some implementations, data center 210 may use an Interior Gateway Protocol (IGP), defined by an owner of data center 210, and either IPv4 or IPv6 addressing to route data. For example, with platform 235, data center 210 may use a private IPv4 address space (e.g., as defined in RFC 1918) or a private IPv6 address space (e.g., as defined in RFC 4193).

PIP cloud service 240 may include an environment that delivers computing as a service, where shared resources, services, etc. may be provided to data center device 220 and/or user device 250 over network 260. PIP cloud service 240 may provide computation, software, data access, and/or storage services that do not require end-user (e.g., data center device 220 and/or user device 250) knowledge of a physical location and configuration of system(s) and/or device(s) that deliver the services.

User device 250 may include a device that is capable of communicating over network 260 with data center devices 220, network device 230, and/or PIP cloud service 240. In some implementations, user device 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a landline telephone; or another type of computation and communication device.

Network 260 may include a network, such as a local area network (LAN), a wide area network (WAN), a metropolitan area network (MAN), a telephone network, such as the Public Switched Telephone Network (PSTN) or a cellular network, an intranet, the Internet, and optical network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
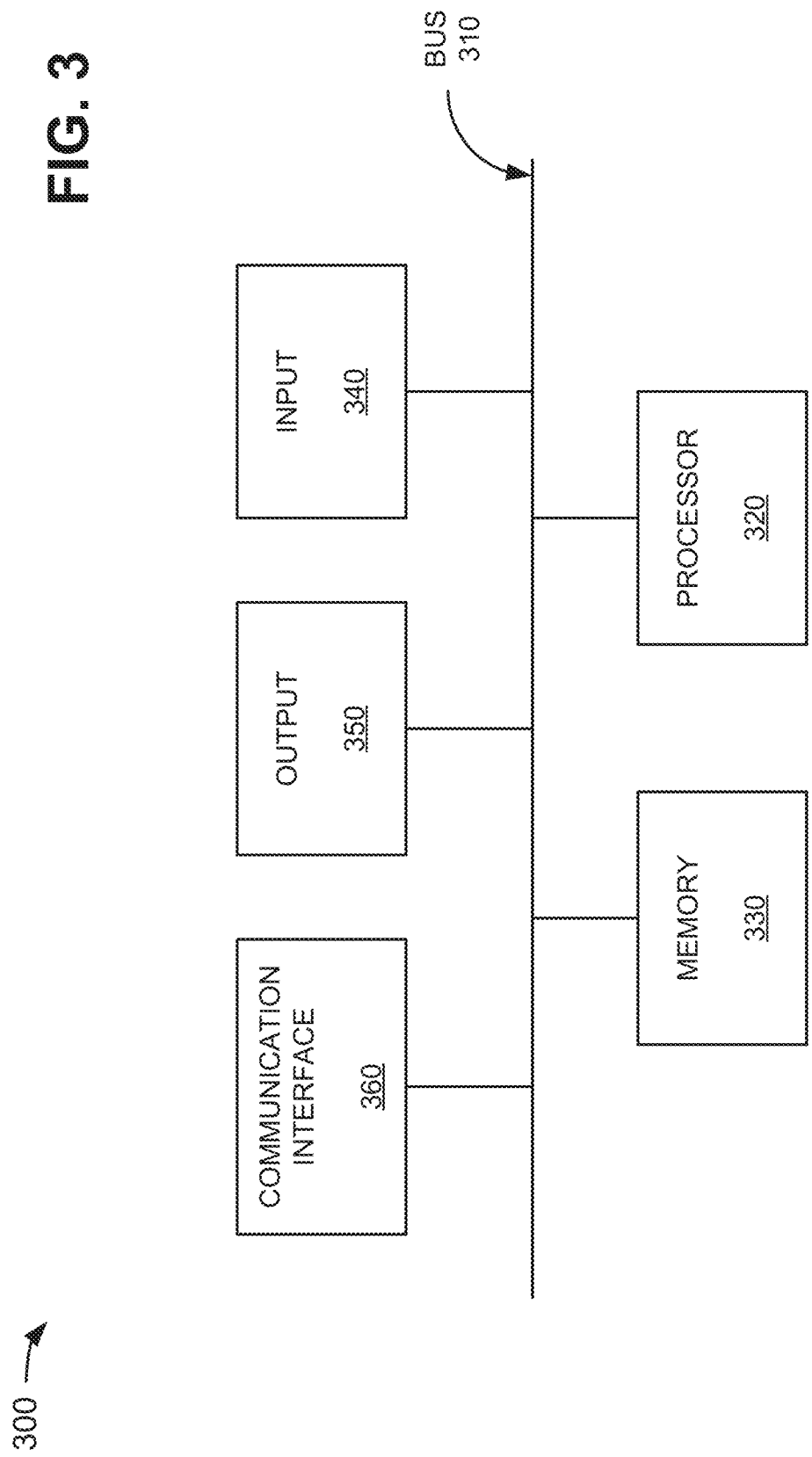
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementation, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
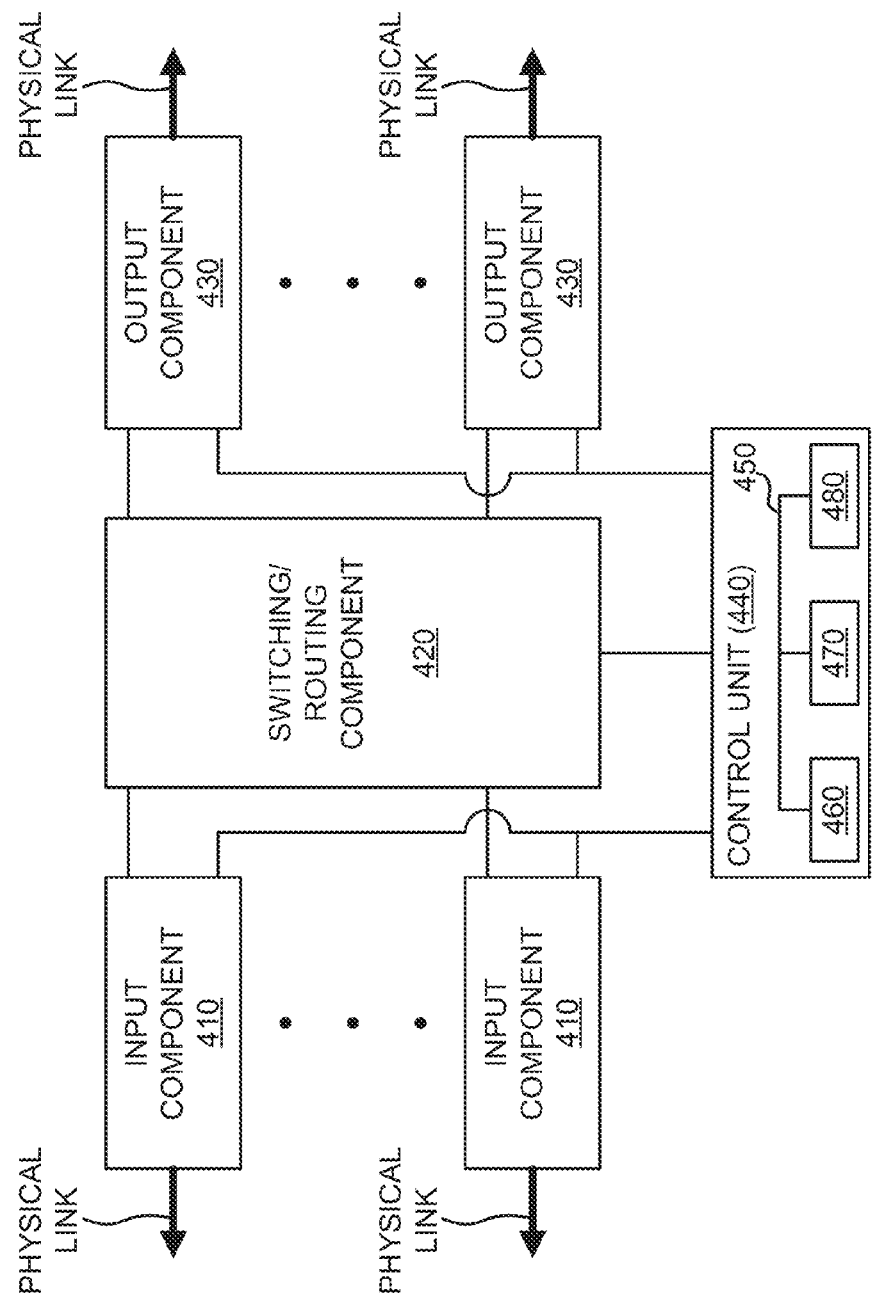
FIG. 4 is a diagram of example components of a device that may correspond to a network device of the environment depicted in FIG. 2.

FIG. 4 is a diagram of example components of a device 400 that may correspond to network device 230 of environment 200. In some implementation, network device 230 may include one or more devices 400 or one or more components of device 400. As shown in FIG. 4, device 400 may include input components 410, a switching/routing component 420, output components 430, and a control unit 440.

Input components 410 may be a point of attachment for physical links and may be a point of entry for incoming traffic, such as data packets. Input components 410 may process incoming traffic, such as by performing data link layer encapsulation or decapsulation. In some implementations, input components 410 may send and/or receive data packets.

Switching/routing component 420 may interconnect input components 410 with output components 430. Switching/routing component 420 may be implemented using many different techniques. For example, switching/routing component 420 may be implemented via busses, via crossbars, and/or with shared memories. The shared memories may act as temporary buffers to store traffic from input components 410 before the traffic is eventually scheduled for delivery to output components 430.

Output components 430 may store data packets and may schedule data packets for transmission on output physical links. Output components 430 may include scheduling algorithms that support priorities and guarantees. Output components 430 may support data link layer encapsulation and decapsulation, and/or a variety of higher-level protocols. In some implementations, output components 430 may send data packets and/or receive data packets.

Control unit 440 may use routing protocols and one or more forwarding tables for forwarding packets. Control unit 440 may connect with input components 410, switching/routing component 420, and output components 430. Control unit 440 may compute a forwarding table, implement routing protocols, and/or run software to configure and manage device 400. Control unit 440 may determine routing for any data packet whose destination address may not be found in the forwarding table.

In some implementations, control unit 440 may include a bus 450 that may include a path that permits communication among a processor 460, a memory 470, and a communication interface 480. Processor 460 may include one or more processors, microprocessors, application-specific integrated circuits (ASICs), field-programmable gate arrays (FPGAs), or other types of processing units that may interpret and execute instructions. Memory 470 may include a random access memory (RAM), a read only memory (ROM) device, a magnetic and/or optical recording medium and its corresponding drive, and/or another type of static and/or dynamic storage device that may store information and instructions for execution by processor 460. Memory 470 may also temporarily store incoming traffic (e.g., a header of a data packet or an entire data packet) from input components 410, for processing by processor 460, before a data packet is directed back to switching/routing component 420, transported by switching/routing component 420, and eventually scheduled to be sent to output components 430. Communication interface 480 may include any transceiver-like component that enables control unit 440 to communicate with other devices and/or systems.

As described herein, device 400 may perform certain operations in response to processor 460 executing software instructions contained in a computer-readable medium, such as memory 470. The software instructions may be read into memory 470 from another computer-readable medium, such as a data storage device, or from another device via communication interface 480. The software instructions contained in memory 470 may cause processor 460 to perform processes described herein. Alternatively, hardwired circuitry may be used in place of or in combination with software instructions to implement processes described herein. Thus, implementations described herein are not limited to any specific combination of hardware circuitry and software.

The number of components shown in FIG. 4 is provided as an example. In practice, device 400 may include additional components, fewer components, different components, or differently arranged components than those shown in FIG. 4. Additionally, or alternatively, one or more components of device 400 may perform one or more functions described as being performed by another one or more components of device 400.

FIG. 5 is a flow chart of an example process 500 for securely routing customer data to a private IP cloud service. In some implementations, one or more process blocks of FIG. 5 may be performed by network device 230 and platform 235. In some implementations, one or more process blocks of FIG. 5 may be performed by another device or a group of devices separate from or including network device 230 and platform 235.

As shown in FIG. 5, process 500 may include receiving data, associated with a customer address, from a user device (block 510). For example, a customer may wish to access PIP cloud service 240, and may utilize user device 250 to generate a request to access PIP cloud service 240. In some implementations, the request may include data and a customer address (e.g., an IP address) associated with user device 250. The customer may cause user device 250 to provide the data and the customer address to a data center device 220 provided in data center 210. Data center devices 220 may be connected to network device 230/platform 235. In some implementations, data center devices 220 may connect to the data center VRF function of platform 235 via a single connection. Data center device 220 may provide the data and the customer address to network device 230/platform 235, via the single connection, and network device 230/platform 235 may receive the data and the customer address. In some implementations, the data center VRF function of platform 235 may receive the data and the customer address.

As further shown in FIG. 5, process 500 may include verifying that the customer address is subscribed to a private cloud service (block 520). For example, the data center VRF function of platform 235 may receive the customer address, and may verify that the customer, associated with the customer address, is subscribed to PIP cloud server 240. In some implementations, the data center VRF function may utilize an Access Control List (ACL) to validate or verify that the customer address is associated with a customer that subscribes to PIP cloud service 240. For example, the ACL may include a list of addresses that may be admitted from data center 210 into platform 235. The addresses may be associated with customers that have subscribed to services provided by PIP cloud service 240. The data center VRF function may compare the customer address to the list of addresses provided in the ACL.

If the customer address matches an address in the list of addresses, the data center VRF function may validate the customer address. In some implementations, if the customer address is validated, the data center VRF function may provide the validated customer address to a particular NAT function associated with the customer. If the address does not match an address in the list of addresses, the data center VRF function may not validate the customer address. In some implementations, if the customer address is not validated, the data center VRF function may prevent the data from leaving data center 210 and may deny the request received from user device 250.

As further shown in FIG. 5, process 500 may include translating the verified customer address to an address that is unique to a customer VRF used in the private cloud service (block 530). For example, the particular NAT function, associated with the customer, may receive the validated customer address, and may translate the customer address to an address that is unique to a particular customer VRF function associated with the customer. In some implementations, the particular NAT function may translate (as needed) a private IP customer address that is validated by the data center VRF function. In some implementations, the particular NAT function may utilize the translated customer address to provide the data to the particular customer VRF function.

In some implementations, the particular NAT function may utilize a translation table to translate the customer address to the unique address. The translation table may include a list of translated or unique customer addresses that are associated with the customer VRF functions. The particular NAT function may identify, in the translation table, a translated customer address based on the customer address. The translated customer address may be associated with the particular customer VRF function.

In some implementations, platform 235 may apply a private NAT function for each private IP customer and the NAT functions may translate customer addresses (as needed) using NAT or network address and port translation (NAPT) functions (e.g., as defined in RFC 2663). The translated addresses may then be passed to corresponding customer VRF functions via the translated addresses, which may be unique to each customer.

As further shown in FIG. 5, process 500 may include providing the data to the customer VRF via the unique address (block 540). For example, the particular NAT function, associated with the customer, may forward the data to the particular customer VRF function, associated with the customer, via the unique address. The particular customer VRF function may receive the data from the particular NAT function. In some implementations, the particular NAT function may utilize the translation table to identify the unique address, and may forward the data to the particular customer VRF function via the unique address.

As further shown in FIG. 5, process 500 may include securely routing the data to the private cloud service via the customer VRF (block 550). For example, the particular customer VRF function, associated with the customer, may securely route the data to PIP cloud service 240 via a secure connection. In some implementations, the particular customer VRF function may utilize a forwarding table to securely route the data to PIP cloud service 240. The forwarding table may include a list of translated addresses and corresponding ports and treatments. The ports may include ports (e.g., output components 430, FIG. 4) of network device 230 that provide secure connections to PIP cloud service 240. The treatments may include information associated with handling data packets, such as, for example, encrypting data, dropping data packets, establishing a tunnel, etc.

In some implementations, process 500 may be inversely utilized when data is to be routed from PIP cloud service 240 to user device 250, via data center 210. For example, PIP cloud service 240 may provide data, destined for user device 250, to the particular customer VRF function. The particular customer VRF function may provide the data to the particular NAT function. The particular NAT function may provide the data to the data center VRF function, and the data center VRF function may provide the data to data center device 220. Data center device 220 may provide the data to user device 250 via the customer address.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6B:
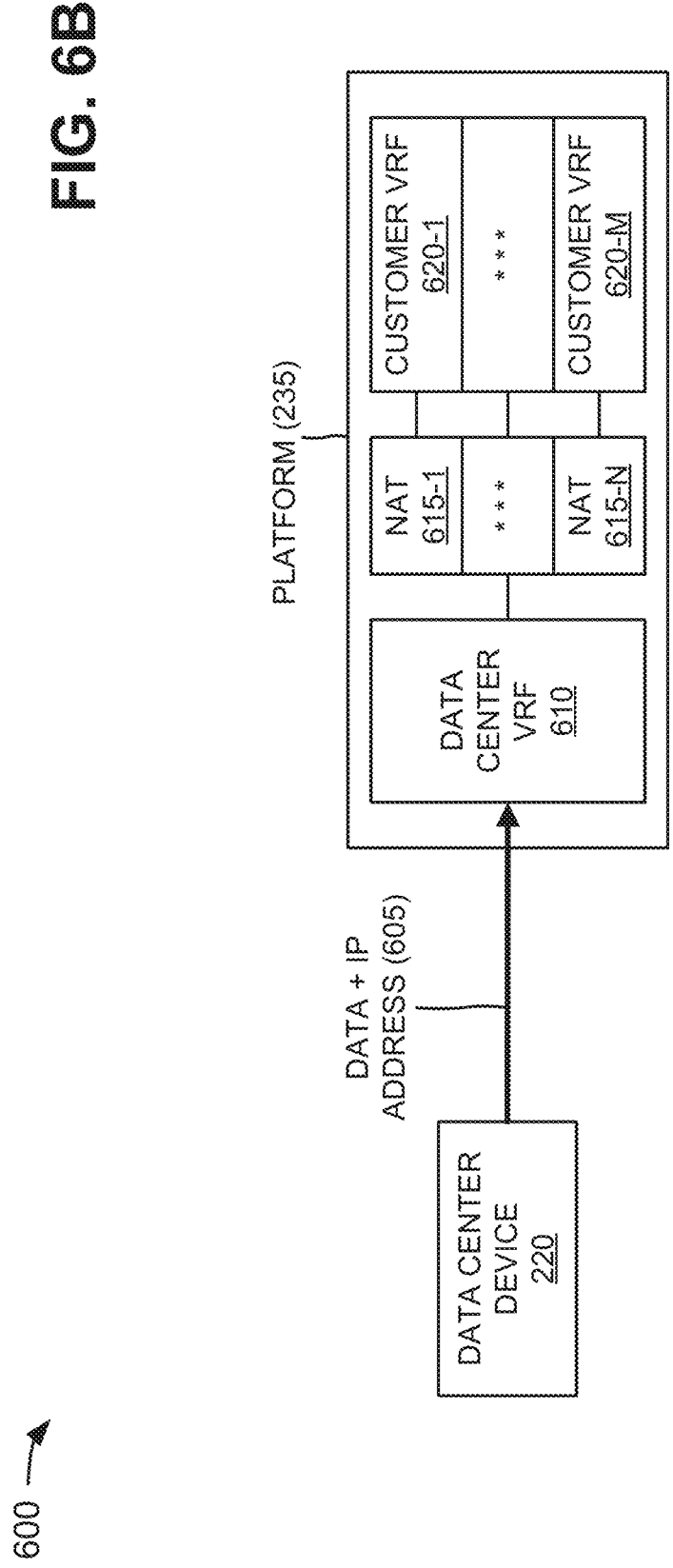

FIGS. 6A-6E are diagrams of an example 600 relating to example process 500 shown in FIG. 5. In example 600, assume that a customer is associated with user device 250, as shown in FIG. 6A. Further, assume that the customer wishes to access a service provided by PIP cloud service 240, and utilizes user device 250 to generate a request to access the service. In example 600, the request may include data and a customer address (e.g., an IP address) associated with user device 250, as indicated by reference number 605 in FIG. 6A. User device 250 may provide data/IP address 605 to data center device 220, and data center device 220 may forward data/IP address 605 to network device 230, as further shown in FIG. 6A.

As shown in FIG. 6B, data center device 220 may forward data/IP address 605 to platform 235 of network device 230. As further shown in FIG. 6B, platform 235 may include a data center VRF function 610, multiple NAT functions 615-1 through 615-N (collectively referred to herein as NAT functions 615, and, in some instances, singularly as NAT function 615), and multiple customer VRF functions 620-1 through 620-M (collectively referred to herein as customer VRF functions 620, and, in some instances, singularly as customer VRF function 620).

Data center VRF function 610 may connect to data center devices 220, and may validate IP addresses received from data center 210. NAT functions 615 may connect to data center VRF function 610, and corresponding NAT functions 615 may connect to corresponding customer VRF functions 620. For example, NAT function 615-1 may connect to customer VRF function 620-1, NAT function 615-2 may connect to customer VRF function 620-2, etc. NAT functions 615 may translate (as needed) private IP customer addresses that are validated by data center VRF function 610. NAT functions 615 may provide the translated addresses to corresponding customer VRF functions 620.

Customer VRF functions 620 may connect to corresponding NAT functions 615, and may securely connect to PIP cloud service 240 (not shown in FIG. 6B). Customer data (e.g., provided by user device 250), after being validated and translated, may be routed by customer VRF functions 620 to PIP cloud service 240. Data provided by PIP cloud service 240 may be routed by customer VRF functions 620 to user device 250, via NAT functions 615 and data center VRF function 610. Customer VRF functions 620 may make PIP cloud service 240 available to private IP customers. In some implementations, the combination of VRF functions 610/620 and NAT functions 615 in a single platform 235 may provide strict separation of routing tables for each private IP customer.

As shown in FIG. 6C, data/IP address 605 may be received by data center VRF function 610. Data center VRF function 610 may include an access control list (ACL) 625, as further shown in FIG. 6C. Access control list 625 may include a valid IP address field, a customer field, and multiple entries associated with the valid IP address field and the customer field. The valid IP address field may include entries identifying valid IP addresses that may be admitted from data center 210 into platform 235. The valid IP addresses may be associated with customers that have subscribed to services provided by PIP cloud service 240. The customer field may include entries identifying customers that are associated with the valid IP addresses. Data center VRF function 610 may determine whether IP address 605 is valid by comparing IP address 605 to the valid IP addresses provided in access control list 625. In example 600, assume that IP address 605 matches a valid IP address (e.g., 172.16.254.1) in access control list 625 (e.g., associated with customer Bob Smith), and that data center VRF function 610 outputs the data and the valid IP address (e.g., 172.16.254.1), as indicated by reference number 630 in FIG. 6C.

Figure 6D:
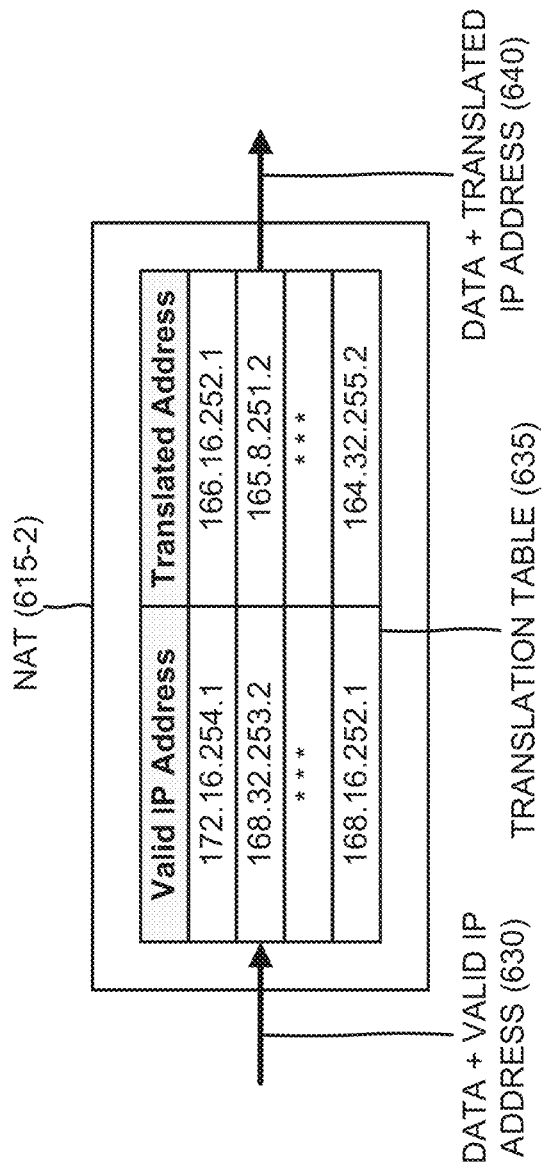

As shown in FIG. 6D, data/valid IP address 630 may be provided to one of NAT functions 615. In example 600, assume that valid IP address 630 is associated with the second NAT function 615-2 since the second NAT function 615-2 is associated with the customer. As further shown in FIG. 6D, NAT function 615-2 may include a translation table 635. Translation table 635 may include a valid IP address field, a translated address field, and entries associated with the valid IP address field and the translated address field. The valid IP address field may include entries identifying valid IP addresses that may be associated with customers that have subscribed to services provided by PIP cloud service 240. The translated address field may include entries identifying translated IP addresses associated with the valid IP addresses. The translated IP addresses may include the valid IP addresses translated into a format understood by or compatible with PIP cloud service 240. NAT function 615-2 may utilize translation table 635 to translate valid IP address 630 into a translated IP address. In example 600, assume that NAT function 615-2 utilizes translation table 635 to translate data/valid IP address 630 (e.g., 172.16.254.1) into data and a translated IP address (e.g., 166.16.252.1), as indicated by reference number 640 in FIG. 6D.

As shown in FIG. 6E, data/translated IP address 640 (e.g., 166.16.252.1) may be provided to one of customer VRF functions 620. In example 600, assume that translated IP address 640 is associated with the fifth customer VRF function 620-5 since the fifth customer VRF function 620-5 is associated with the customer. As further shown in FIG. 6E, customer VRF function 620-5 may include a forwarding table 645. Forwarding table 645 may include a translated address field, a port field, a treatment field, and entries associated with the translated address field, the port field, and the treatment field. The translated address field may include entries identifying translated IP addresses that may be associated with customers that have subscribed to services provided by PIP cloud service 240. The port field may include entries identifying ports (e.g., output components 430, FIG. 4) of network device 230 that may be utilized to communicate with secure connections provided to PIP cloud service 240. Each of the identified ports may be associated with a corresponding translated IP address identified in the translated address field. The treatment field may include entries identifying how to handle data packets, such as, for example, encrypting data, dropping data packets, etc. Each treatment field entry may be associated with a corresponding port field entry.

Customer VRF function 620-5 may utilize forwarding table 645 to securely forward the data to PIP cloud service 240. In example 600, assume that customer VRF function 620-5 utilizes forwarding table 645 to match translated IP address 640 (e.g., 166.16.252.1) with a translated IP address entry (e.g., 166.16.252.1) provided in the translated address field. Customer VRF function 620-5 may then identify a port (e.g., Port 1) of network device 230 and a treatment based on a port entry and a treatment entry (e.g., Encryption) that correspond to the matching translated IP address entry. Customer VRF function 620-5 may perform the identified treatment on the data (e.g., encryption), and may forward treated data 650 to the identified port (e.g., Port 1). As further shown in FIG. 6E, the identified port (e.g., Port 1) may enable data 650 to be securely provided to PIP cloud service 240 via a secure connection 655.

As indicated above, FIGS. 6A-6E are provided merely as an example. Other examples are possible and may differ from what was described with regard to FIGS. 6A-6E.

The foregoing disclosure provides illustration and description, but is not intended to be exhaustive or to limit the implementations to the precise form disclosed. Modifications and variations are possible in light of the above disclosure or may be acquired from practice of the implementations. To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a device, data from a user device,
        the data being associated with a customer address,
            the customer address being associated with the user device,
            the customer address overlapping with addresses associated with the device;
    comparing, by a data center virtual route forwarding (VRF) function of the device, the customer address to a list of addresses;
    verifying, by the data center VRF function of the device, that the customer address is associated with a customer that subscribes to a private cloud service, based on comparing the customer address to the list of addresses;
    translating, by the device and when the customer address is verified, the customer address to a unique address that is unique to a customer VRF function provided by the device,
        the customer VRF function being used in the private cloud service;
    providing, by the device and based on translating the customer address, the data to the customer VRF function via the unique address; and
    routing, by the device and based on providing the data to the customer VRF function, the data to the private cloud service via the customer VRF function and a secure connection.

2. The method of claim 1, where the data is received from a data center device that receives the data from the user device.

3. The method of claim 1, where verifying that the customer address is associated with the customer that subscribes to the private cloud service comprises:
    comparing the customer address to a list of valid Internet protocol (IP) addresses; and
    verifying that the customer address is associated with the customer that subscribes to the private cloud service when the customer address matches a valid IP address provided in the list of valid IP addresses.

4. The method of claim 1, further comprising:
    preventing the data from being routed to the private cloud service when the customer address is not verified.

5. The method of claim 1, where translating the customer address to the unique address comprises:
    utilizing network address translation (NAT) or network address and port translation (NAPT) to translate the customer address to the unique address.

6. The method of claim 1, where the unique address is in a format that is compatible with the private cloud service.

7. The method of claim 1, where the device connects to a data center device via a single connection and the method further comprises:
    receiving the data from the user device via the data center device and via the single connection.

8. A device, comprising:
    one or more processors to:
        provide a data center virtual route forwarding (VRF) function to:
            receive data from a user device,
                the data being associated with a customer address,
                    the customer address being associated with the user device,
                    the customer address overlapping with addresses associated with the device;
            compare the customer address to a list of addresses; and
            verify that the customer address is associated with a customer that subscribes to a private cloud service, based on comparing the customer address to the list of addresses;
        provide a network address translation (NAT) function to:
            translate, when the customer address is verified, the customer address to a unique address that is unique to a customer VRF function provided by the device,
                the customer VRF function being used in the private cloud service, and
            output, based on translating the customer address, the data via the unique address; and
        provide the customer VRF function to:
            receive the data from the NAT function via the unique address, and
            route the data to the private cloud service via a secure connection.

9. The device of claim 8, where the data is received from a data center device that receives the data from the user device.

10. The device of claim 8, where the data center VRF function is further to:
    compare the customer address to a list of valid Internet protocol (IP) addresses, and
    verify that the customer address is associated with the customer that subscribes to the private cloud service when the customer address matches a valid IP address provided in the list of valid IP addresses.

11. The device of claim 8, where the data center VRF function is further to:
    prevent the data from being routed to the private cloud service when the customer address is not verified.

12. The device of claim 8, where the data center VRF function is further to:
    select the NAT function from one or more NAT functions, provided by the device, based on the customer address.

13. The device of claim 8, where the NAT function is further to:
  select the customer VRF function from one or more customer VRF functions, provided by the device, based on the unique address.

14. The device of claim 8, where the data center VRF function connects to a data center device via a single connection and where the data center VRF function is further to:
  receive the data from the user device via the data center device and via the single connection.

15. A non-transitory computer-readable medium for storing instructions, the instructions comprising:
  one or more instructions that, when executed by one or more processors of a device, cause the one or more processors to:
    receive data from a user device,
      the data being associated with a customer address, and
      the customer address being associated with the user device, and
      the customer address overlapping with addresses associated with the device;
    compare, by a data center virtual route forwarding (VRF) function of the device, the customer address to a list of addresses;
    verify, by the data center VRF function of the device, that the customer address is associated with a customer that subscribes to a private cloud service, based on comparing the customer address to the list of addresses;
    translate, when the customer address is verified, the customer address to a unique address that is unique to a customer VRF function provided by the device,
      the customer VRF function being used in the private cloud service;
    select the customer VRF function from one or more customer VRF functions, provided by the device, based on the unique address;
    provide the data to the selected customer VRF function via the unique address; and
    route the data to the private cloud service via the customer VRF function and a secure connection.

16. The non-transitory computer-readable medium of claim 15, where the one or more instructions, when executed by the one or more processors, further cause the one or more processors to:
  select a NAT function from one or more NAT functions, provided by the device, based on the customer address, and
  utilize the selected NAT function to translate the customer address to the unique address.

17. The non-transitory computer-readable medium of claim 15, where the one or more instructions, when executed by the one or more processors, further cause the one or more processors to:
  compare the customer address to a list of valid Internet protocol (IP) addresses, and
  verify that the customer address is associated with the customer that subscribes to the private cloud service when the customer address matches a valid IP address provided in the list of valid IP addresses.

18. The non-transitory computer-readable medium of claim 15, where the one or more instructions, when executed by the one or more processors, further cause the one or more processors to:
  prevent the data from being routed to the private cloud service when the customer address is not verified.

19. The non-transitory computer-readable medium of claim 15, where the one or more instructions, when executed by the one or more processors, further cause the one or more processors to:
  utilize network address translation (NAT) or network address and port translation (NAPT) to translate the customer address to the unique address.

20. The non-transitory computer-readable medium of claim 15, where the data center VRF function connects to one or more data center devices via a single connection and where the one or more instructions, when executed by the one or more processors, further cause the one or more processors to:
  receive the data from the user device via:
    the data center VRF function,
    one of the one or more data center devices, and
    the single connection.

* * * * *